Dec. 17, 1968    PO-LUNG LIANG    3,416,554
TEMPERATURE SENSITIVE CONTROL FOR A FLUID
PRESSURE ACTUATED VALVE
Filed Dec. 2, 1965
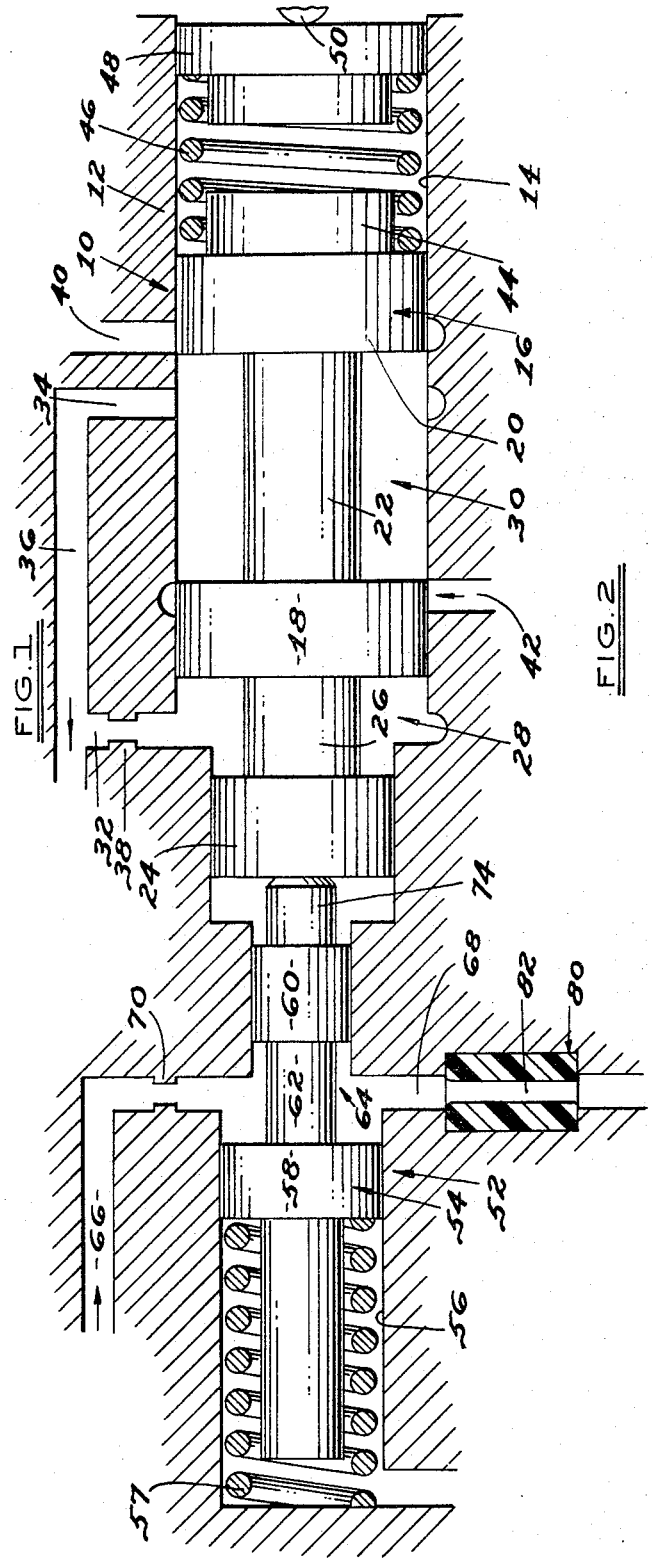
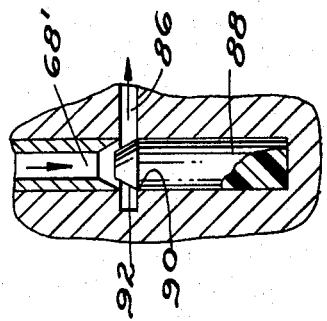
PO-LUNG LIANG
INVENTOR
BY John R. Faulkner
Robert E. McCollum
ATTORNEYS United States Patent Office 3,416,554
Patented Dec. 17, 1968

3,416,554
TEMPERATURE SENSITIVE CONTROL FOR A
FLUID PRESSURE ACTUATED VALVE
Po-Lung Liang, Lincoln Park, Mich., assignor to Ford
Motor Company, Dearborn, Mich., a corporation of
Delaware
Filed Dec. 2, 1965, Ser. No. 511,095
9 Claims. (Cl. 137—116.3)

ABSTRACT OF THE DISCLOSURE

A temperature sensitive actuator for controlling the movement of a fluid pressure regulating valve by means to bias the valve towards a non-regulating position with a force of a magnitude that varies in inverse proportion to the changes in temperature.

---

This invention relates in general to a fluid pressure control mechanism. More particularly, it relates to a mechanism for controlling the movement of a valve assembly in response to changes in temperature of the fluid controlled by and controlling the movement of the valve.

Most motor vehicles equipped with automatic transmissions experience a change in the transmission shift pattern on cold days due to changes in the temperature of the fluid used to actuate one or more of the various clutches and brakes and other devices. For example, when the oil is cold, the flow through the vehicle speed responsive governor is slower, resulting in a lower output pressure for a given vehicle speed as compared to when the oil is warm. Since most automatic transmissions control the movements of the shift valves by the differential between the vehicle speed governor pressure acting on one end of the valve and accelerator pedal controlled throttle valve pressure acting on the opposite end, a lowering of the governor pressure will delay the shift. This altering of the shift pattern is obviously undesirable. The invention eliminates this by providing a temperature sensitive mechanism that changes the throttle valve pressure in proportion to the change in temperature of oil to permit the lower governor pressure to shift the valve at substantially the same time as it would were the oil at normal operating temperature.

It is, therefore, a primary object of the invention to provide a control for a valve assembly that will automatically adjust the fluid pressure output from the valve as a function of changes in temperature of the fluid.

A further object of the invention is to provide a fluid pressure control valve unit consisting of a pressure regulator valve that is biased towards a non-regulating position by a net force that varies in inverse proportion to the changes in temperature of the fluid used in connection with the valve.

A still further object of the invention is to provide a control valve unit for a motor vehicle automatic transmission control system that will permit substantially the same transmission shift pattern regardless of whether the operating oil is warm or cold.

Another object of the invention is to provide a fluid pressure control unit consisting of: a fluid pressure regulating valve that is movable in one direction to a regulating position; is biased towards a non-regulating position by suitable means that is acted upon by fluid under pressure in a manner to oppose the force urging the regulating valve to a non-regulating position; and, the build-up of pressure of the latter fluid is controlled by a fluid vent line having either a thermally sensitive variable area orifice or thermally sensitive material projecting into the vent line to variably restrict the line in proportion to the increases in temperature of the fluid acting against the biasing means.

Other objects, features and advantages of the invention will become apparent upon reference to the succeeding, detailed description thereof, and to the drawings illustrating the preferred embodiments thereof; wherein, FIGURE 1 is a schematic representation of a control valving embodying the invention; and FIGURE 2 shows a modification of the FIGURE 1 showing.

As stated previously, the preferred installation of the invention is as a control unit in an automatic transmission control system for a motor vehicle, although it will be clear after a consideration of the details hereinafter that it will have use in many installations other than that shown where a change in the movement of the valve is made to compensate for changes in temperature of the fluid controlling the regulation.

The details and operation of the automatic transmission control system in which the invention has a preferred use are not shown since they are known and believed to be unecessary for an understanding of the invention. Suffice it to say, however, that most automatic transmissions in use today consist of one or more planetary gear units having members that are selectively controlled in their rotation by the automatic engagement or disengagement of bands or clutches according to a predetermined schedule. Generally, a change from one gear ratio to another is controlled by a shift valve that is usually spring biased to one position to block a supply line to the servo actuating the particular brake or clutch, and is moved to an open position by the net differential between a vehicle speed sensitive governor pressure acting on one end of the valve and a vehicle accelerator pedal controlled throttle pressure regulator valve pressure acting on the opposite end of the valve.

Since, as stated previously, cold oil in the control system delays a build-up in governor pressure, the transmission will shift later than when the oil is at normal operating temperature. This delay causes the engine to wind up to a higher than normal speed before the shift occurs, which results in additional work and poorer fuel economy. Also, a higher engine speed is undesirable at this time because the engine should be permitted to warm up slowly from a cold start condition.

The invention, in general, is directed to a control valving including a temperature compensating device that will alter the pressure output from the valving in accordance with the temperature of the fluid.

FIGURE 1 shows a pressure regulator valve 10 for providing a controlled throttle valve pressure that varies in direct proportion to the degree of depression of the conventional vehicle accelerator pedal (not shown). More specifically, the unit includes a valve body 12 having a stepped diameter bore 14 that slidably receives a differential area spool valve 16. The valve has a pair of similar area lands 18 and 20 connected by a neck portion 22, and a smaller diameter land 14 connected to land 18 by a neck portion 26. The spacing between the adjacent lands provides two annular fluid pressure chambers 28 and 30 connected respectively by lines 32 and 34 to a common fluid pressure output signal line 36. Line 32 is provided with an orifice 38 to prevent temporary fluctuations in the pressure of the fluid in line 36 from affecting the pressure level of the fluid in chamber 28.

Valve body 12 has a fluid vent or exhaust line 40 connected to a fluid sump (not shown), and a main fluid pressure supply line 42. Line 42 may be connected to any convenient source of fluid under pressure, such as, for example, to the conventional engine driven transmission oil pump, through a pressure regulator valve.

Land 20 of valve 16 includes a stem portion 44 that serves as a guide for a compression spring 46 seated between land 20 and a valve actuating member 48. Member 48 is adapted to be moved manually or automatically in a leftward direction by a lever or link 50 to compress spring 46 and move valve 16 to the left. In the preferred installation, lever 50 would form a part of the conventional vehicle accelerator pedal linkage or an engine manifold vacuum servo controlled by the accelerator pedal so that depression of the accelerator pedal from its idle speed position will transmit a predetermined force to member 48 to move it to the left.

Abutting valve 16 is the stem 51 of a spool valve 54. Valve 54 is slidably movable in the stepped diameter bore 56 of valve body 12, and is biased at all times against valve 16 by a spring 57. Valve 54 has a pair of differential area lands 58 and 60 interconnected by a neck portion 62.

Neck portion 62 and lands 58 and 60, together with the cooperating varying diameter portions of valve body 12, define a fluid pressure annulus 64. Opposite sides of the annulus are connected, respectively, to a supply line 66 containing fluid at a constant pressure and to a fluid pressure exhaust or vent line 68. Line 66 contains an orifice 70 to maintain pressure in the line when vent line 68 is fully opened, in a manner that will become clear later.

The differential area between the adjacent faces of lands 58 and 60 results in a net fluid pressure force in chamber 64 that acts against land 58 to oppose the force of spring 57.

The fluid in line 66 may be supplied from a branch of main supply line 42, or a branch of the signal pressure line 36, or from any other suitable source, as desired. If supplied from a high pressure line such as line 42, however, to reduce fluid losses, preferably it would first pass through a pressure reducing valve.

The fluid vent line 68 contains a temperature sensitive member 80 having an orifice 82 that controls the build-up of pressure in chamber 64. Member 80 consists of a block of thermally sensitive material that is expandable and contractible in response to changes in the temperature of the fluid, such as oil, in passage 68 from a set level or norm, to decrease or increase, respectively, the area of orifice 82.

It should be noted that the various face areas of the lands of the regulating valve 16 and valve 54 are chosen so that when no force is exerted against plug 48 by accelerator pedal link 50, regulating valve 16 and valve 54 will be in the positions shown. That is, regardless of the oil temperature, the net force between springs 46 and 57 and the differential fluid pressure force acting in chamber 64, if any, would position the valve 16 as shown blocking off line 42 and connecting chambers 30 and 28 to exhaust line 40.

In operation, assume the vehicle accelerator pedal (not shown) is depressed, thereby indicating a certain throttle valve pressure demand for line 36. Plug 48 is moved leftwardly by link 50 and through spring 46 exerts a force on valve 16 sufficient to move it to the left to open supply port 42 to chamber 30 and line 36 while closing port 40. This admits fluid under pressure to line 32 and chamber 28 so that pressure builds up against the differential area between lands 18 and 24. When the combined forces of the net pressure in chamber 28 and net force exerted on valve 16 by plug stem 51 exceeds the forces of spring 46 and link 50, valve 16 will move back to the right until chamber 30 is cracked open to exhaust line 40. At this point, the pressure in chamber 30 will decay until it is again overcome by the force of spring 46, at which point the valve will again move to the left. Valve 16 will thus hunt back and forth until an equilibrium fluid regulating position is obtained where the fluid and spring forces are balanced. The fluid under pressure in line 36 will then be at a particular level corresponding to the given throttle setting.

Further depression of the accelerator pedal linkage 50 to a new position will cause a movement of valve 16 to a new pressure regulating position to establish a new pressure level in output line 36. Thus, for each throttle increasing or decreasing position of pedal 50, a new pressure level will be established in line 36.

Assume now that the temperature of the oil drops below the normal operating (when the engine is warm) temperature. The material in block 80 will contract and increase the size of orifice 82 to decrease the restriction to flow through line 68. This decreases the differential fluid pressure force in chamber 64 on land 58 so that the spring 57 now can exert a greater force against valve 16. For the same throttle pedal setting, therefore, it now takes a lower pressure in chamber 28 to move valve 16 back to its regulating position, resulting in a lower output pressure in line 36.

Thus, if the valve assembly of the invention is installed in a motor vehicle transmission control system, a start-up of the motor vehicle on a cold winter day will provide a lower throttle valve pressure so that the shift valve will be moved by a lower governor pressure while the shift pattern remains substantially the same as when the oil is warm.

The size of orifice 82 would be chosen to provide the greatest restriction when the fluid is at normal operating temperature, to provide the desired fluid pressure force in chamber 64 at this time.

FIGURE 2 shows a modification in which the fluid exhaust line 68' is joined to a right-angled vent port 86, communication between the two being controlled by an orifice block 88. The orifice block seats in an aperture 90 in vent port 86, and has conically-shaped end portions 92 that are spaced from and cooperate with similarly shaped beveled ends of exhaust line 68'. The orifice block would be formed of a thermal sensitive material that expands or contracts longitudinally in response to temperature changes of the material from the normal oil operating temperature.

From the foregoing, it will be seen that the invention provides a fluid pressure control valving having thermally sensitive means for varying the control movements of the valve as a function of changes in temperature of an operating fluid. It will thus be seen that the invention can be used to provide a more desirable operation of a motor vehicle on cold days, and one that corresponds substantially to the normal operating conditions of the vehicle.

While the invention has been illustrated in its preferred embodiments in the figures, it will be clear to those skilled in the arts to which the invention pertains that many changes and modifications may be made thereto without departing from the scope of the invention.

I claim:

1. A fluid pressure control valve mechanism comprising a source of fluid under pressure, a fluid pressure supply line, conduit means connecting the fluid from said supply line, an on-off position control valve variably controlling flow through said conduit means to said supply line, first means for moving said valve to an open position, second means biasing said valve to a closed position, said second means including control means responsive to changes in temperature of said fluid for varying the bias on said valve in inverse proportion to changes in temperature of said fluid, said second means including spring means operatively biasing said valve against said first means, said control means including fluid pressure force means acting against said spring means in a direction to counteract the force of said spring means, said fluid pressure means including a thermally sensitive means controlling the change in pressure of said fluid pressure means in proportion to changes in temperature of said fluid pressure.

2. A valve mechanism as in claim 1, wherein said valve comprises a fluid pressure regulating valve progressively varying the pressure of the fluid to said supply line in proportion to the movement of said valve.

3. A valve mechanism as in claim 1, wherein said valve comprises a fluid pressure regulating valve progressively varying the pressure of the fluid to said supply line from a minimum to a maximum in proportion to the opening movement of said valve.

4. A fluid pressure control valve mechanism comprising a source of fluid under pressure, a fluid pressure supply line, conduit means connecting the fluid from said source to said supply line, and on-off position control valve controlling flow through said conduit means to said supply line, first means for moving said valve to an open position, second means biasing said valve to a closed position said second means including control means responsive to changes in temperature of said fluid for varying the bias on said valve in inverse proportion to changes in temperature of said fluid, said control means including, a movable member abutting said valve, said second means including spring means biasing said movable member in a direction urging said valve to a closed position, said control means further including a fluid under pressure subject to changes in temperature acting on said movable member in opposition to said spring means, a fluid vent line connected to said latter fluid under pressure, and temperature responsive means associated with said latter fluid under pressure and said vent line variably restricting said vent line in proportion to increases in temperature of said latter fluid under pressure to control the pressure of the fluid acting against said member.

5. A valve mechanism as in claim 4, said temperature responsive means comprising a flow control element in said vent line consisting of thermally responsive material having an orifice-like opening therein for the flow of the latter fluid under pressure therethrough to said vent line, increases and decreases in the temperature of the fluid flowing through said opening respectively expanding and contracting said opening to control the pressure build-up of said latter fluid against said member.

6. A valve mechanism as in claim 4, wherein said temperature responsive means comprises a thermally responsive member projecting into said vent line and expandable to restrict said vent line in proportion to the increase in temperature of said latter fluid.

7. A fluid pressure control valve mechanism comprising a source of fluid under pressure, a fluid pressure supply line, conduit means connecting the fluid from said source to said supply line, a fluid pressure regulating valve in said conduit means controlling flow through said conduit means to said supply line and movable progressively between closed and open positions for respectively blocking or progressively opening said conduit means, spring means biasing said valve towards a closed position, means for moving said valve progressively towards an open position to supply fluid to said supply line at a pressure varying in proportion to the opening movement of said valve, means applying a portion of the fluid in said supply line to said valve in opposition to said means for opening said valve to assist in providng the regulating action, and additional means operably movable in response to changes in temperature of the fluid effecting a bias of said valve towards a closed position with a force that varies in proportion to changes in temperature of the fluid, said additional means comprising an actuator abutting said regulating valve, said spring means biasing said actuator in a regulating valve closing direction, second conduit means containing fluid under pressure subject to changes in temperature, means applying the latter fluid under pressure against said actuator in a direction to oppose said spring means force, a fluid vent connected to said second conduit means, and thermally responsive means variably restricting said vent as a function of the change in temperature of said latter fluid to control the pressure build-up of said latter fluid against said actuator.

8. A fluid pressure control valve mechanism as in claim 7, said thermally responsive means consisting of a thermally responsive material having a flow restricting orifice through which said latter fluid flows, said orifice expanding and contracting in area in proportion to the decrease and increase in the temperature of said latter fluid.

9. A fluid pressure control valve mechanism as in claim 8, said thermally responsive means consisting of a thermally responsive material projecting into said vent in a flow restricting manner and being contacted by said latter fluid, said material expanding in a further flow restrictive manner into said vent in response to increases in temperature of said latter fluid to effect an increase in the pressure of the fluid acting on said actuator.

References Cited

UNITED STATES PATENTS

| | | | |
|---|---|---|---|
| 2,319,498 | 5/1943 | Gerard | 62—223 |
| 2,965,120 | 12/1960 | Snyder | 137—468 |
| 3,313,336 | 4/1967 | De Palma | 251—11 |

WILLIAM F. O'DEA, *Primary Examiner.*

HOWARD M. COHN, *Assistant Examiner.*

U.S. Cl. X.R.

92—1; 236—92